United States Patent [19]

Frost

[11] 4,324,048
[45] Apr. 13, 1982

[54] LOCATOR FOR RAIL ALIGNING DEVICE

[75] Inventor: Ralph S. Frost, Olympia Fields, Ill.

[73] Assignee: Chemetron Railway Products, Inc., Chicago, Ill.

[21] Appl. No.: 112,587

[22] Filed: Jan. 16, 1980

[51] Int. Cl.³ .................. B25B 1/10; B23P 19/00
[52] U.S. Cl. .................................. 33/180 R; 33/287; 33/412; 269/249
[58] Field of Search ............... 33/1 Q, 287, 203.11, 33/412, 181 R, 180 R; 228/212, 189; 269/249, 43; 238/49 R; 29/281

[56] References Cited

U.S. PATENT DOCUMENTS

| | | | |
|---|---|---|---|
| 1,670,253 | 5/1928 | Gilbert et al. | 269/37 X |
| 1,979,886 | 11/1934 | Keith | 33/287 |
| 2,610,661 | 9/1952 | Romine | 269/249 X |
| 3,488,467 | 1/1970 | Ansel et al. | |
| 3,838,487 | 10/1974 | Maeda | 29/281.5 |
| 4,234,176 | 11/1980 | Goff et al. | 269/249 |

Primary Examiner—William D. Martin, Jr.
Attorney, Agent, or Firm—John K. Williamson

[57] ABSTRACT

A horizontal locator for a rail alignment device engages the sides of the rail head only at points vertically remote from the running surface of the rail whereby deformation of the rail head adjacent the running surface does not adversely affect the accuracy of the locator. A reference surface on the horizontal locator is adapted to engage the running surface of the rail to properly dispose the side-contact members with respect to the rail head.

3 Claims, 3 Drawing Figures

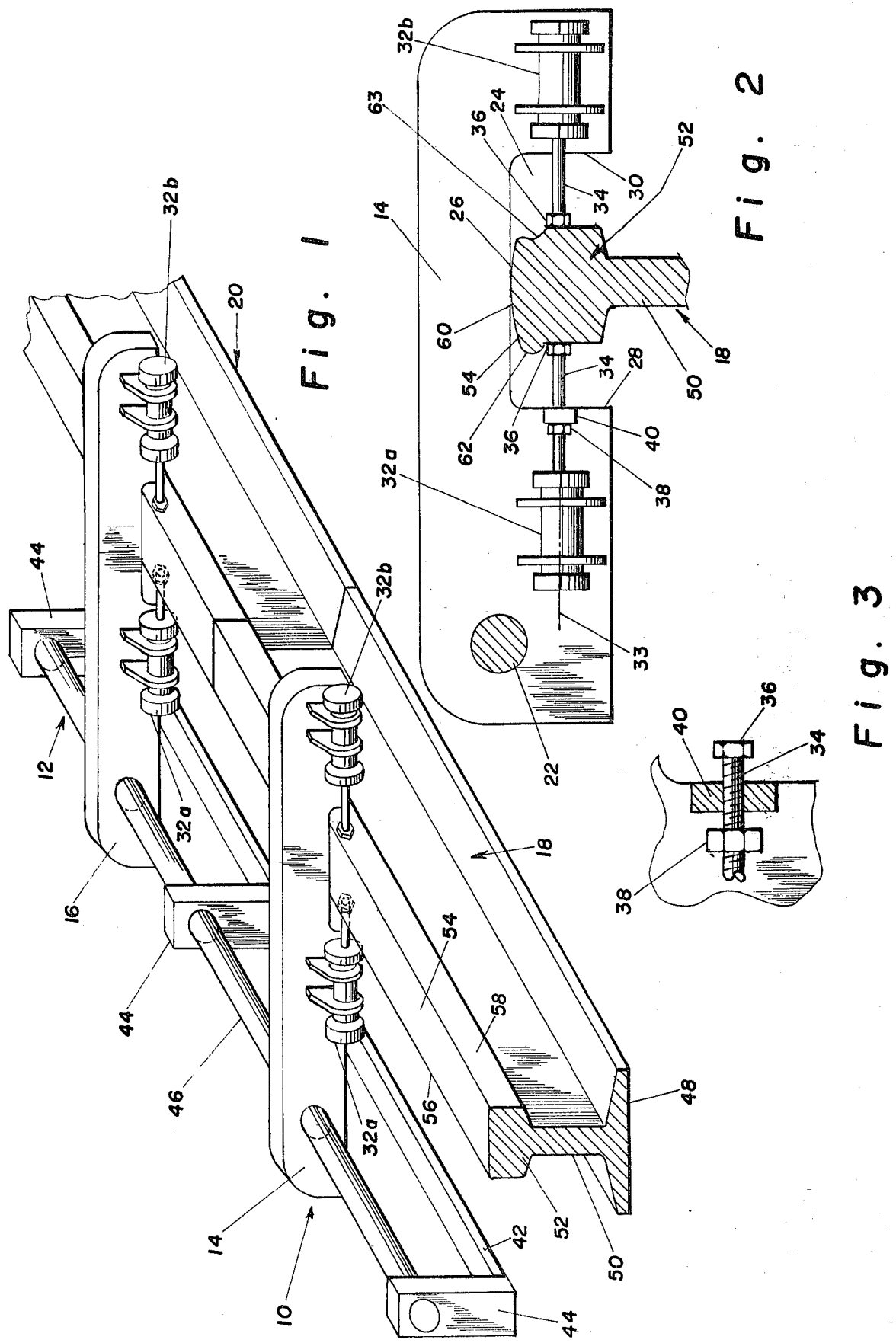

LOCATOR FOR RAIL ALIGNING DEVICE

TECHNICAL FIELD

This invention relates to alignment devices in general, and is particularly concerned with an improved side locating mechanism in a device of the type which precision aligns the ends of rail sections in preparation for welding.

BACKGROUND ART

For some time, it has been a practice to weld together railway rails to provide improved track over the older bolted-end method of joining rails. Typically, the standard 39 foot rail sections are welded together to form rail strings approximately ¼ mile in length, the welded rail strings being subsequently transported to the track construction site. The welded rail strings are formed from new rail sections as well as used sections salvaged from old track. Welded rail track was proved so superior to older track construction, that American railroads are systematically replacing bolted rail tracks with newer welded rail.

A number of machines have been developed for welding rail sections, probably the most successful of which is the flash butt welding machine of the type shown, for example, in U.S. Pat. No. 3,488,467. In the flash butt welding process, the rail sections are clamped in precise end to end alignment, and an electrode is attached to each section, the sections are then shifted axially toward and away from one another as current is supplied to the electrodes to preheat the rail ends in a desired manner, and finally the rail sections are upset to effect the weld.

Rail alignment in such flash butt welding machines (and in other welders as well) is of critical importance to the successful welding of rail section. In this latter regard, the rail industry has developed rather rigid tolerances for alignment of rail sections in the interest of safety and improved service life.

While it is desirable that the base and the upright web of adjacent rail sections be properly aligned, it is of prime importance that the heads of the rail sections be precisely aligned since this is the portion of the finished rail which is engaged by the rolling stock. Accordingly, it is preferred to align rail sections by the use of locators which contact the rail head as opposed to other portions of the rail.

New rail sections are relatively easy to align for welding since they generally present a uniform cross section from rail to rail. Thus, when welding a given lot of new rail, the operator may simply make a single alignment set-up and relay upon this to provide accurate alignment for all welds of the lot. However, this is not the case with used rail sections which may vary widely in cross section depending upon the type of track service which they have experienced. Moreover, even used rail sections from the same stretch of track will vary in cross section depending upon the particular location of the section along the track.

Alignment of used rail with non-adjustable locators with contact the rai; head (the preferred method as indicated above) is an especially difficult problem inasmuch as the rail head may be substantially deformed as a result of its contact with the rolling stock. Typical of such deformation is gauge wear which results in a portion of the gauge side of the rail head being eroded adjacent the running surface and head flow which results in an outwardly extending lip being formed on either side of the rail head adjacent the running surface. When either gauge wear or head flow is present, the accuracy of alignment devices having non-adjustable locators which contact the sides of the rail head, may be significantly disturbed.

BRIEF SUMMARY OF THE INVENTION

The present invention overcomes the aforementioned problems regarding alignment of used rails by presenting a locator adapted to engage the rail head sides only at points remote from the running surface.

A counteracting pair of hydraulic cylinders is mounted for movement to and from a position straddling the rail head whereby opposite sides of the head may be engaged by the cylinders. The line of action of the pair of cylinders is adapted to be generally horizontal when in the rail-straddling position, and there is provided a running surface contacting face arranged relative to the cylinders in a manner whereby the line of action of the cylinders is generally remote from the running surface of the rail head when the rail is straddled by the cylinders.

One cylinder is provided with an adjustable stop to present a reference point for aligning the rail section. The adjustable cylinder applies to higher force to its ram that the other cylinder to keep its ram against the adjustable stop. Adjustment of the stop may be manual as shown, semi-automatic or fully-automatic. In any case, a second pair of cylinders is, of course, provided for engaging and aligning a second rail section in preparation for welding of the aligned sections.

BRIEF DESCRIPTION OF THE DRAWINGS

FIG. 1 is a partial, respective view showing a pair of side alignment locators constructed in accordance with the principles of the present invention;

FIG. 2 is an enlarged elevational view of one of the locators shown in FIG. 1; and FIG. 3 is an enlarged, fragmentary, cross sectional view showing a detail of construction of the locator.

DETAILED DESCRIPTION OF THE BEST MODE FOR CARRYING OUT THE INVENTION

In FIG. 1, there is shown a locator 10 which forms the horizontal alignment means in a rail alignment device (not shown) of the type designed for use in a rail flash-butt welding machine of the type disclosed in U.S. Pat. No. 3,488,467 issued to Ansel et al. and entitled "Method and Apparatus for Welding Rail Sections to Form a Continuous Rail". The locator 10 is adapted to align the rail sections in the horizontal plane, it being understood that vertical alignment of the sections is first accomplished by conventional means.

The locator 10 includes an arm support 12 adapted to be fixedly mounted upon the frame of the flash-butt welder and a pair of rail contact elements or arms 14, 16 mounted on the support 12 for pivotal and shifting movement as will be described. The arms 14, 16 are adapted to engage respective rail sections 18, 20 for axial end-to-end alignment thereof as shown for example, in FIG. 1.

The arms 14, 16 are identical in construction and accordingly, only the details of arm 14 will be further described, it being understood that each feature of the arm 14 has a corresponding feature in the arm 16.

Referring now to FIG. 2, it is seen that the arm 14 is generally elongate having a circular aperature 22 passing through one end thereof and a channel 24 of generally rectangular transverse cross section formed in the opposite end thereof. The channel 24 has a bottom presenting a running surface engaging face 26 and a pair of opposed side walls 28, 30 extending generally perpendicularly from the face 26.

As shown in FIG. 2, a pair of opposed, double acting hydraulic cylinder assemblies 32a, 32b are mounted with a common line of action (represented by line 33 in FIG. 2) on the arm 14 adjacent respective side walls 28, 30. Each of the cylinders 32 has an outwardly extending reciprocable ram 34 provided with a rail contacting pin 36 on its outer most end for engaging the rail 18 as will be described.

The ram 34a is provided as shown in FIG. 3 with an adjustable stop 38 for cooperating with a collar 40 on the arm 14 to limit the movement of the ram 34a such that a predetermined position may be set for the location of the rail section 18 when the latter is engaged by the pins 36. The hydraulic system (not shown) for the cylinders 32 is arranged in a known manner to provide greater force to the ram 34a than the ram 34b such that the collar 40 remains biased against the stop 38 when the cylinders are actuated. Alternatively, cylinder 32a could be made larger than cylinder 32b.

The arm support 12 has an elongate base 42 and three uprights 34 mounted at spaced locations therealong. A guide rod 46 is rigidly secured above the base 42 by the uprights 44. As shown in FIG. 1, the arms 14, 16 complementally receive the guide 46 in the respective apertures 42 to effect attachment of the arms to the support 12. In this manner, the arms 14, 16 may be pivoted about the axis of the guide rod 46 as well as shifted axially therealong. Accordingly, the arms 14, 16 may be swung to an out-of-the-way position when their use is not required, and may also be shifted toward and away from one another as required in the flash-butt welding process. The particular construction of the arm support 12 is relatively unimportant as long as the arms 14, 16 are supported for movement as described. If desired, the arms 14, 16 may be mounted such that only one of them is shiftable along the rod 46 since one rail section is normally held stationary in the flashbutt welding process.

Considering the rail sections 18, 20 in more detail, each has a lowermost base 48, an upstanding web 50 extending perpendicularly from the base, and a head attached to the upper portion of the web 50. The head presents an upwardly facing running surface 54 and gauge the field sides 56, 58 respectively depending from the surface 54 at opposite edges thereof. The surface 54 is arcuate in transverse cross section such that there is presented an uppermost portion or apex 60 as shown, for example, in FIG. 2. If the rail sections 18, 20 have been previously used, there will most likely be a deformation of the cross section of the surface 54 as for example, the lip 62 also shown in FIG. 2. Additionally, gage wear may exist as indicated in FIG. 2 by the numeral 63.

An important feature of the present invention is the relationship between the rail-engaging face 26 and the line of action 33 of the cylinders 32, together with the relative size of the pins 36 in relation to the sides 56, 58. In this regard, the pins 36 are adapted to contact only a portion of the vertical height of the sides 56, 58 as opposed to the conventional method of contacting these sides along their full height. Additionally, the spacing between the face 26 and the line of action 33 is such that the pins 36 contact the sides 56, 58 at locations relatively remote from the surface 54. In preferred forms, the vertical offset between surface 26 and the line of action 33 is at least ¾ inches. In this manner, as shown for example in FIG. 2, the relative position between the pins 36 and the sides 56, 58 is unaffected by deformation of running surface 54 (such as the lip 62). Thus, alignment errors introduced by crown deformation in used rail are substantially eliminated.

Industrial Applicability

As previously explained, the present invention is particularly designed for use in machines of the type which flash-butt weld rail sections to form along rail strings for use in welded track construction. The locator 10 provides a simple, yet highly efficient means for overcoming the problems heretofore encountered in horizontal alignment of rail sections in preparation for flash-butt welding.

By arranging the rail engaging cylinders 32 in the manner contemplated in this invention, precise location of the rail sections can be accomplished regardless of a condition of the running surface or sides of the head; accordingly, used rail from a variety of service conditions and track locations may be quickly and accurately aligned for end to end welding.

What I claim is:

1. In a rail alignment machine of the type having rail locators for correctly positioning normally horizontal rail sections in horizontal and vertical planes respectively to effect end-to-end alignment of the sections, an improved horizontal locator including:
    a generally horizontal support bar;
    a spaced apart pair of rail contact elements pivotally mounted on said bar for swinging movement about the longitudinal axis thereof;
    at least one of said elements also being shiftably supported on the bar for reciprocation along the longitudinal axis thereof;
    each of said contact elements comprising:
        an elongate arm extending generally perpendicularly of said bar, and having a pivoted end attached to the bar and a free end remote therefrom;
        a fixed reference surface formed in said arm adjacent said free end, said reference surface being adapted to engage the running surface of a rail head from above;
        a pair of opposed, reciprocable, counteracting side-contact members mounted on said arm for cooperatively clamping said rail head on opposite sides thereof;
        said side-contact members being offset from the plane of said reference surface a predetermined distance such that the sides of said rail are contacted by said member only at points remote from said running surface when the latter is contacted by said reference surface.

2. The invention of claim 1, said members each comprising a fluid-actuated cylinder assembly and a rail-engaging pin driven by said assembly, the line of action of said assemblies extending parallel to said reference surface.

3. The invention of claim 2, one of said cylinder assemblies being provided with an adjustable stop means for positioning said rail head a selected distance from the longitudinal axis of said bar.

* * * * *